Figure 1:
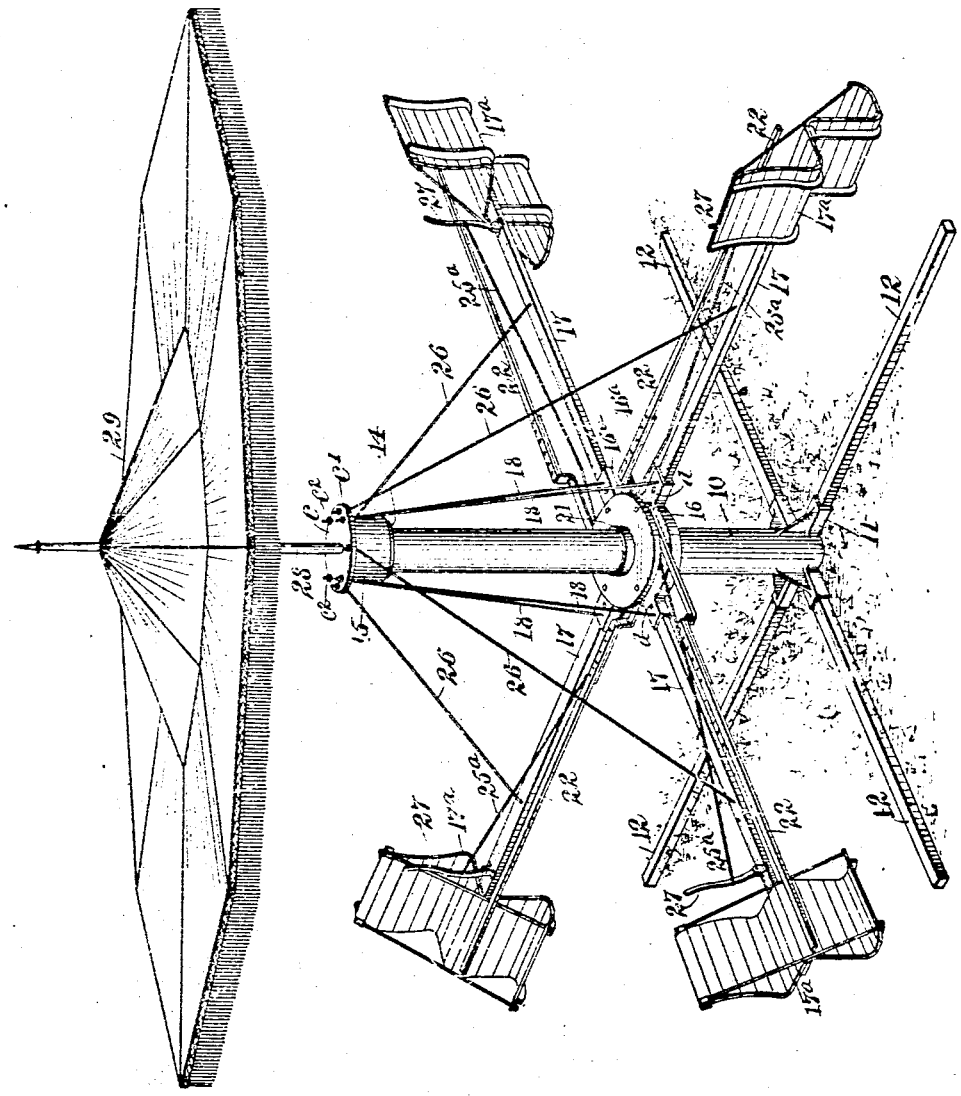

F. E. MENDENHALL.
ROUNDABOUT AMUSEMENT APPARATUS.
APPLICATION FILED SEPT. 28, 1909.

965,644.

Patented July 26, 1910.

3 SHEETS—SHEET 1.

WITNESSES
F. G. Hachenberg.
Wm. P. Patton

INVENTOR
Frank E. Mendenhall
BY
Munn & Co
ATTORNEYS

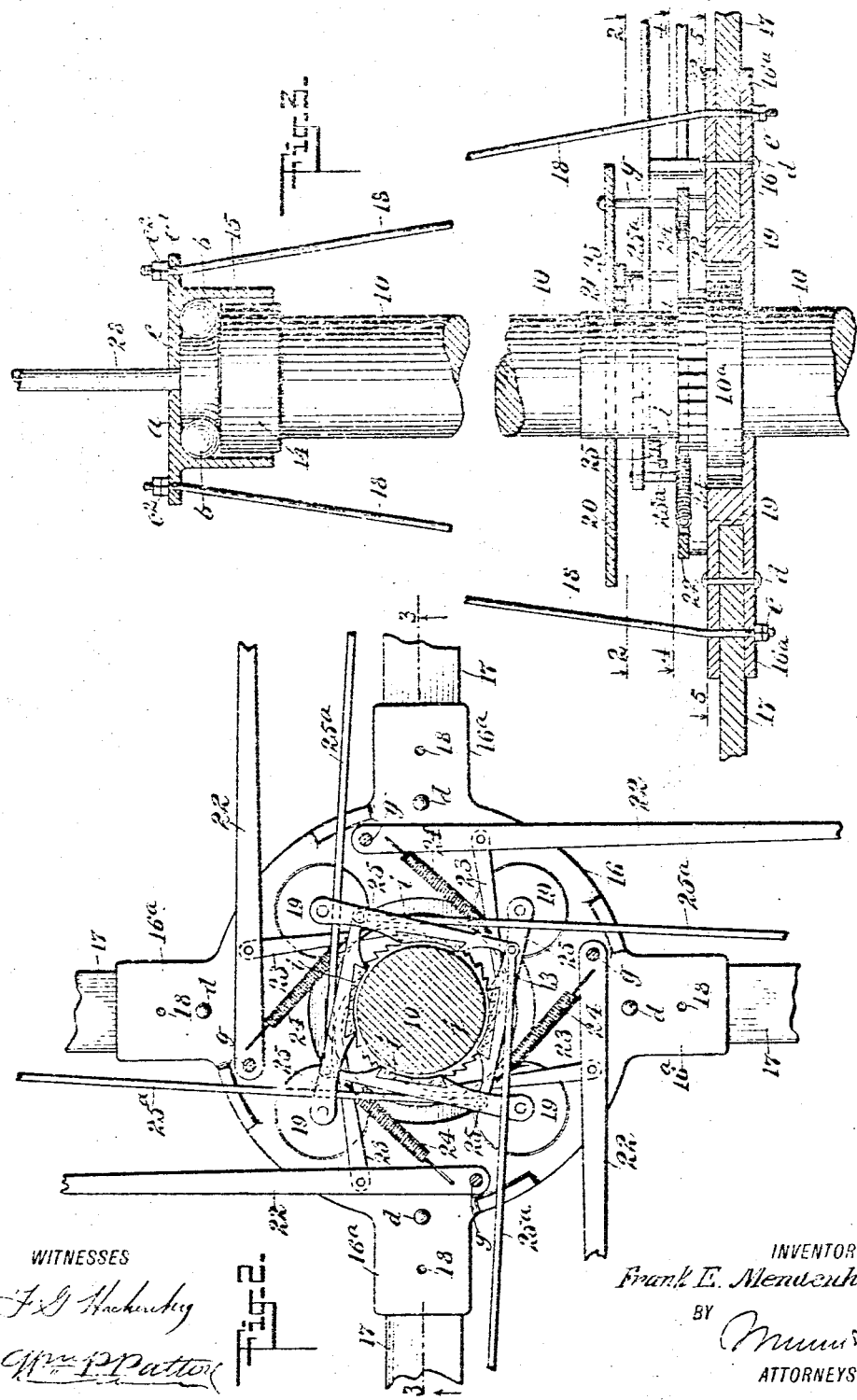

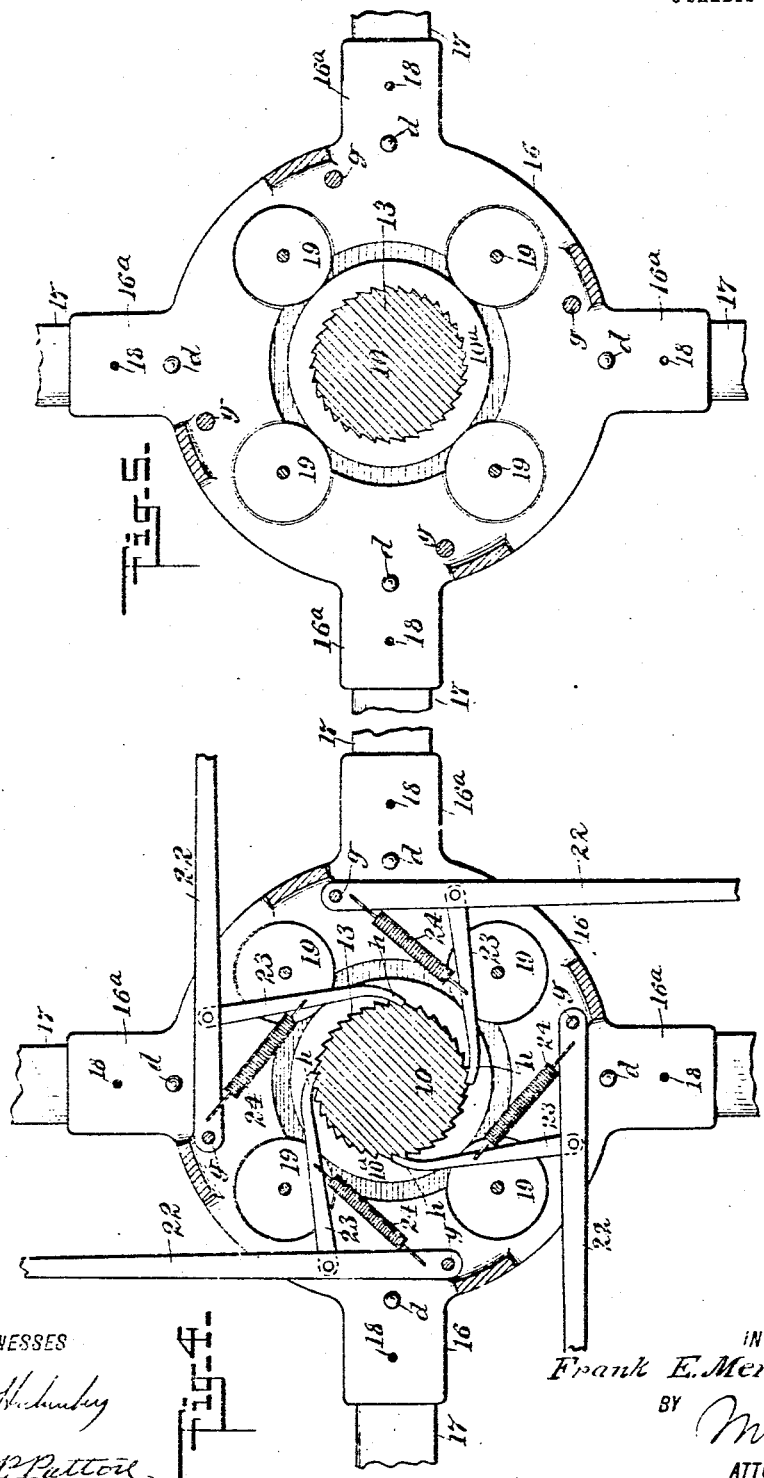

UNITED STATES PATENT OFFICE.

FRANK EVORY MENDENHALL, OF TILDEN, NEBRASKA.

ROUNDABOUT AMUSEMENT APPARATUS.

965,644. Specification of Letters Patent. Patented July 26, 1910.

Application filed September 28, 1909. Serial No. 519,966.

*To all whom it may concern:*

Be it known that I, FRANK E. MENDENHALL, a citizen of the United States, and a resident of Tilden, in the county of Madison and State of Nebraska, have invented a new and Improved Roundabout Amusement Apparatus, of which the following is a full, clear, and exact description.

This invention relates to rotary apparatus designed for the carriage of passengers for amusement, and popularly known as "merry go rounds".

The purpose of my invention is, to provide novel details of construction for an apparatus of the character indicated, that adapt it for manual rotation, and control of the rotary movement, so as to render the machine safe in operation; and a further object of my invention is, to so construct operative details of the apparatus, that friction will be greatly reduced, and the machine adapted for manual propulsion with the exertion of moderate effort.

The invention consists in the novel construction and combination of parts, as is hereinafter described, and defined in the appended claims.

Reference is to be had to the accompanying drawings forming a part of this specification, in which similar characters of reference indicate corresponding parts in all the views.

Figure 1 is a perspective view of the improved amusement apparatus; Fig. 2 is a partly sectional plan view, substantially on the line 2—2 in Fig. 3; Fig. 3 is a broken partly sectional side view of the working parts, taken substantially on the line 3—3 in Fig. 2; Fig. 4 is a partly sectional plan view, substantially on the line 4—4 in Fig. 3; and Fig. 5 is a partly sectional plan view, substantially on the line 5—5 in Fig. 3.

As shown in the drawings, 10 represents a post that is preferably cylindrical in form, is of suitable height, and is supported in a vertical position by a base plate 11, from which radially project a plurality of sill bars 12, the plate and sill bars being designed to seat upon a floor, or the ground as may be preferred, and afford a movable base for the entire apparatus. On the post 10, at a convenient height, a circumferential ratchet-toothed rack 13 is formed or secured.

Upon the upper end of the post 10 a bearing block 14 is formed or secured, having a circular contour, and a rabbeted upper corner, forming a race-way $a$ for a plurality of balls $b$ to occupy. A bonnet 15, consisting of a top plate $c$ from which a circular flange depends, is loosely mounted on the bearing block and balls $b$, and as shown in Fig. 3, the parts described provide a ball bearing for the support and rotation of the bonnet on the post 10.

A circular hub plate 16, having a central bore of a diameter to loosely receive the post 10, is mounted upon said post. The hub plate 16 is provided with a plurality of spaced radial arms $16^a$, four appearing in the drawings, and in the hub plate and said arms socket recesses are formed for the reception of the similar elongated arms 17, that are inserted in the sockets at their inner ends and secured by bolts $d$ so that all are disposed horizontally.

On the top plate $c$ of the bonnet 15, a circumferential flange $c'$ is formed, having four spaced perforations therein, through which the upper ends of four hanger rods 18 are upwardly inserted and secured by nuts $c^2$. From the top plate $c$, the hanger rods 18 are downwardly extended, and respectively are inserted down through a perforation in each short arm $16^a$, wherein they are secured by nuts $e$, that engage their threaded lower ends, as is shown in Fig. 3.

In an annular recess formed in the upper side of the hub plate 16, a collar $10^a$, which is formed or secured on the post 10, is seated, and at equal distances apart, and from the center of the hub plate four circular flat bottomed recesses are formed, wherein four similar anti-friction rollers 19 are centrally pivoted, that have a loose contact at their peripheries with a like surface on the collar $10^a$, as shown in Figs. 4 and 5.

On the upper ends of four pivot studs $g$, that project vertically from the hub plate 16, equally distant from each other, and near the edges of said hub plate, a cap plate 20 is mounted and secured in a plane parallel with said hub plate.

Upon the post 10, above the ratchet-toothed gear 13, a cylindrical sleeve 21 is secured.

On the studs $g$, four levers 22 are respectively mounted near like ends of each one, and as is clearly shown in Fig. 4, a pawl toe $h$ on the free end of an arm 23, pivoted on each lever 22 an equal distance from the corresponding stud $g$, meshes with the teeth on the ratchet gear 13, said arms each being held in engagement therewith by a contractile spring 24.

Upon the pivot that supports each antifriction roller 19, and above respective rollers, an end of a brake lever 25 is loosely secured, each of said levers holding a brake block $i$, that is disposed opposite the sleeve 21.

At the outer ends of each of the elongated arms 17, a suitable seat $17^a$ is secured, which seats face in the same direction, for the occupancy of persons who desire to ride on the apparatus; and to aid in supporting the weight imposed on the seats, four guy rods 26 are extended down from the flange $c'$ on the bonnet 14 and secured at their lower ends upon the arms 17, respectively, as shown in Fig. 1. The levers 22 are given sufficient length to dispose their outer ends at the front of respective seats $17^a$, for their rocking movement by persons who occupy said seats. Upon the remaining end of each brake lever 25, a brake rod $25^a$ is pivoted, and extended laterally therefrom toward a seat $17^a$, the outer end of each brake rod being pivoted upon an upright lever 27, that is pivoted at its lower end on a respective arm 17, at the side of an adjacent seat $17^a$.

In operation, the levers 22 are rocked in a horizontal plane, by persons occupying the seats $17^a$, and cause a rotatable movement of the arms 17 and the seats $17^a$, due to the successive engagement of the pawl toes $h$ on the arms 23 with the teeth of the ratchet gear 13. If at any time it is desired to decrease the speed of rotary movement had by the seats, those riding in the seats may control the rapidity of motion by manipulation of the levers 27, so as to pull upon the rods $25^a$.

Upon a standard 28, that is erected on the post 10 and projects vertically a suitable distance, a canopy 29 is horizontally supported, having such area as will fully cover and protect those who occupy the seats $17^a$, from the sun, this cover being removable at will, and thus may be dispensed with when the apparatus is placed under other cover such as a porch.

It will be noted that the hub plate 16 and all parts carried thereon, are hung from the ball bearing device on the upper end of the post 10, thereby reducing the friction of rotary movement such a degree, that a small child can easily rotate the seats $17^a$. It will further be seen that the engagement of the rollers 19 with the collar $10^a$ at equidistant points, steadies the motion of the machine, and prevents lateral swaying motion, so that the pull of one lever 22 will move the machine as freely as if all the seats were occupied by persons operating the levers.

Obviously the number of arms and seats may be reduced, and the length of the arms may be changed to suit the situation occupied by the apparatus, so that it may be located on a lawn, or be placed on a porch or in a room, as may be desired.

Having described my invention, I claim as new and desire to secure by Letters Patent:

1. A roundabout comprising a post, a cap mounted for rotation on top of the post, a plate having a hub encircling the post, said plate having recesses circular in cross section and communicating with the opening of the hub, wheels journaled in the recesses and engaging the post, arms extending radially from the hub, seats on the arms, a ratchet ring on the post, levers pivoted at one end on the hub and extending at the other adjacent to a seat, a pawl on each lever for engaging the ratchet ring, a spring normally pressing the pawl into engagement with the ring, and brace rods arranged between the cap and the inner and outer ends of the arms.

2. A roundabout comprising a post, a cap mounted for rotation on top of the post, a plate having a hub encircling the post, said plate having recesses circular in cross section and communicating with the opening of the hub, wheels journaled in the recesses and engaging the post, arms extending radially from the hub, seats on the arms, a ratchet ring on the post, levers pivoted at one end on the hub and extending at the other adjacent to a seat, a pawl on each lever for engaging the ratchet ring, a spring normally pressing the pawl into engagement with the ring, brace rods arranged between the cap and the inner and outer ends of the arms, brake levers pivoted to the axes of the wheels, and means adjacent to each seat for operating one of said levers.

In testimony whereof I have signed my name to this specification in the presence of two subscribing witnesses.

FRANK EVORY MENDENHALL.

Witnesses:
W. E. BROGAN,
H. W. KINGERY.